Nov. 10, 1953    R. C. MACHLER    2,658,390
RADIATION PYROMETRY
Filed Feb. 6, 1948    4 Sheets-Sheet 1
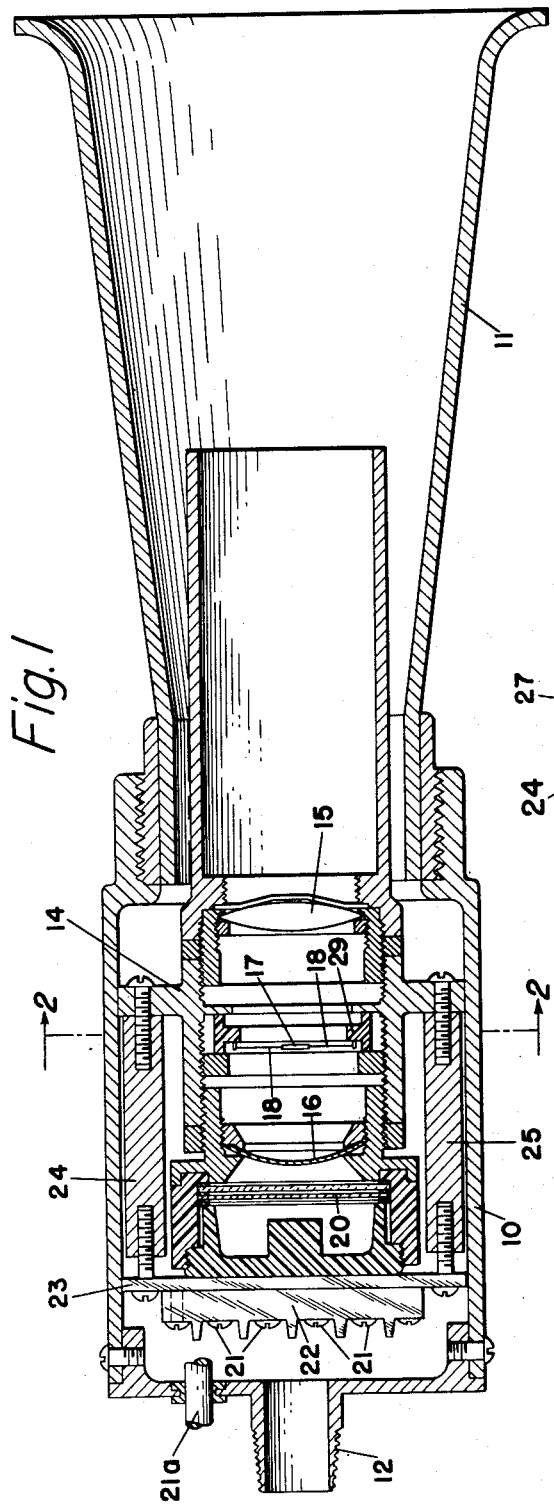
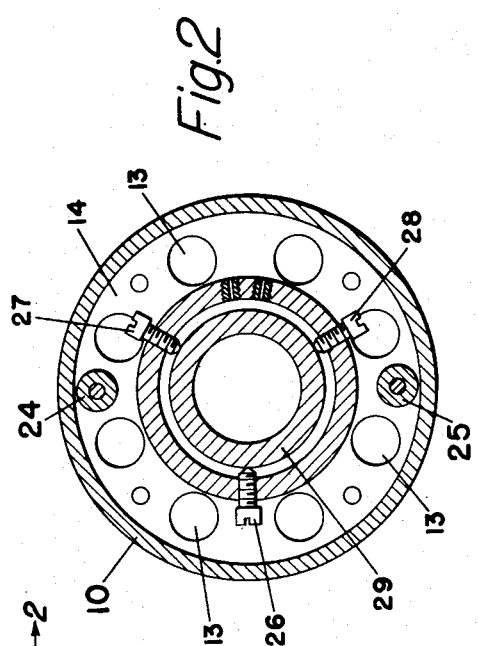
INVENTOR
RAYMOND C. MACHLER
BY
Woodcock and Phelan
ATTORNEYS Nov. 10, 1953  R. C. MACHLER  2,658,390
RADIATION PYROMETRY
Filed Feb. 6, 1948  4 Sheets-Sheet 2

INVENTOR
RAYMOND C. MACHLER
BY
Woodcock and Phelan
ATTORNEYS

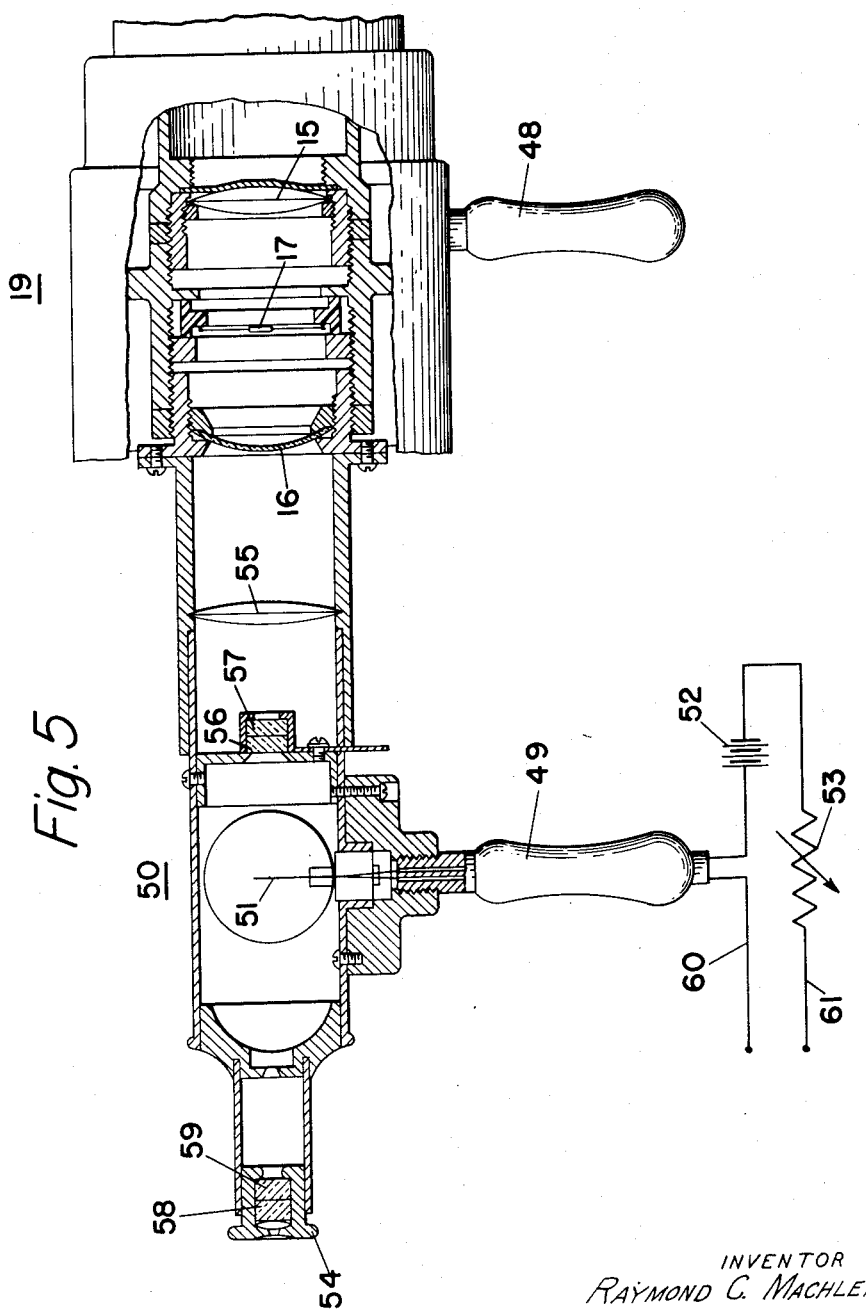

Nov. 10, 1953  R. C. MACHLER  2,658,390
RADIATION PYROMETRY
Filed Feb. 6, 1948  4 Sheets-Sheet 4

INVENTOR
RAYMOND C. MACHLER
BY
Woodcock and Phelan
ATTORNEYS

Patented Nov. 10, 1953

2,658,390

UNITED STATES PATENT OFFICE 2,658,390

RADIATION PYROMETRY

Raymond C. Machler, Philadelphia, Pa., assignor to Leeds and Northrup Company, Philadelphia, Pa., a corporation of Pennsylvania Application February 6, 1948, Serial No. 6,771

9 Claims. (Cl. 73—355)

The invention relates to pyrometers of the type in which temperature may be determined from thermal radiation from a mass, and has for an object the provision of a method and a system by means of which the pyrometer will be substantially unaffected by change in emissivity but will respond to temperature changes with a sensitivity of the order of that which would be obtained by measurement of temperature with an optical pyrometer of the disappearing filament type.

Heretofore, there has been proposed the use of two photoelectric type optical pyrometers, one of which receives red rays, and the other green rays; that is, the respective photo-cells receive radiant energy of different wavelengths but the difference in wavelengths is small, and it was intended that such wavelengths should closely approach each other in order to make the instrument more accurate. While an optical pyrometer of the foregoing ratio type may be used to measure temperature, the sensitivity is exceedingly low; so low that the measurements would shown errors of plus or minus 10° C. even when sighted on a constant emissivity target. Accuracies of the foregoing order are insufficient to commend such a pyrometer to those skilled in the art, because an experienced workman, such as employed in the steel industry, can without the aid of any instrument estimate temperatures of molten metal to within plus or minus 15° C.

In connection with instruments of the foregoing type it has been insisted that the wavelengths should approach each other in order that the radiation shall be free from error due to emissivity and so that the system will indicate the true temperature of the radiant body regardless of changes in intensity of received radiation.

It is to be further understood that in the use of the usual optical pyrometer, the accuracy of determining temperature will be within 10° C. of the true temperature even through the emissivity changes from .4 to .45; the exact value of the temperature cannot be ascertained because of the indeterminate character of the emissivity.

In accordance with the present invention it has been found that by utilizing thermal radiation of wavelengths which respectively fall within widely differing bands, there may be produced such an increase in sensitivity of the system as a whole as to make possible accurate measurement of temperature and to make that measurement relatively independent of emissivity changes and relatively independent of absorption due to smoke or to intervening masking materials. More particularly, there is produced a first potential difference in accord with thermal radiation of short wavelength from the mass whose temperature is to be measured. The magnitude of this potential difference is changed in accordance with change in the intensity of the radiation of short wavelength. At the same time there is produced a second potential difference in accord with thermal radiation of a materially longer wavelength from the mass, the magnitude of which is varied in accordance with change in intensity of said latter radiation of longer wavelength. It has been found that the temperature of the mass may be accurately determined from the ratio of the two potential differences so produced.

In a preferred form of the invention a barrier layer cell having a current output in accordance with visible thermal radiation (0.4 to 0.7 micron) has been utilized in production of a potential difference of magnitude varying with change in temperature of the mass. A radiation pyrometer responsive to radiation extending beyond the visible spectrum (i. e. beyond 0.7 micron) is utilized for production in the network of a second potential difference whose magnitude also varies with the temperature of the mass. Said network also includes means for opposing one of said potential differences against the other and for determining the fraction or ratio of one with respect to the other. The ratio, so determined, varies with the temperature of the mass and is utilized for measurement of that temperature.

For further objects and advantages of the invention, reference is to be had to the following description taken in conjunction with the accompanying drawings in which:

Fig. 1 is a sectional view of a preferred form of apparatus constructed in accordance with the invention;

Fig. 2 is a sectional view taken on the line 2—2 of Fig. 1;

Figure 3:
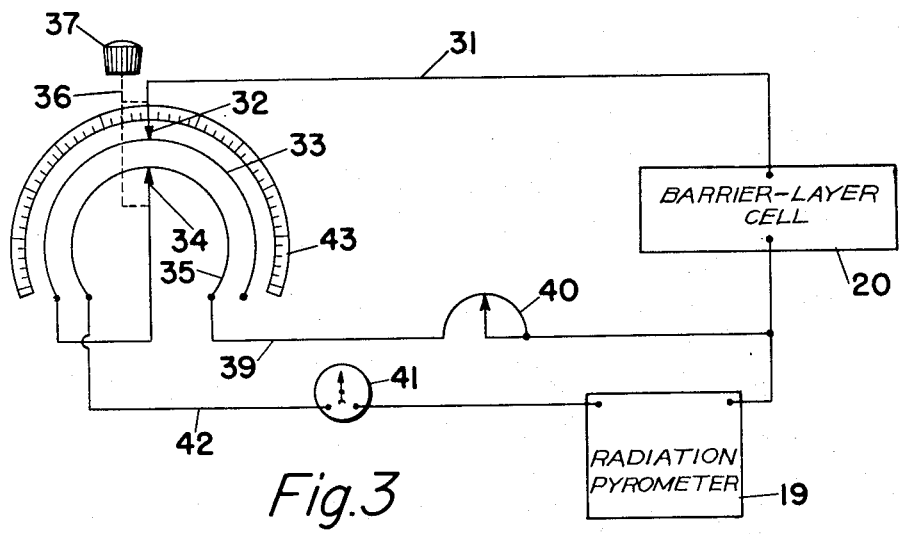
Figure 4:
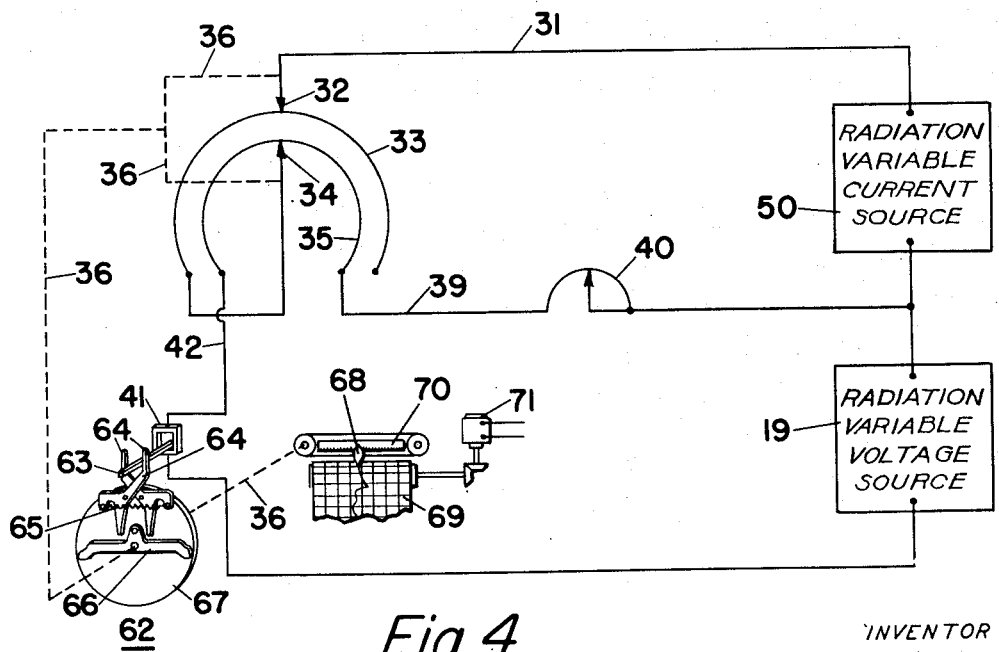

Fig. 3 diagrammatically illustrates the measuring network and the apparatus of Fig. 1 in terms of the two functions performed thereby;

Fig. 4 diagrammatically illustrates a modified system of the same general type as Fig. 3;

Fig. 5 is a sectional elevation of a modified form of the invention; and

Figure 7:
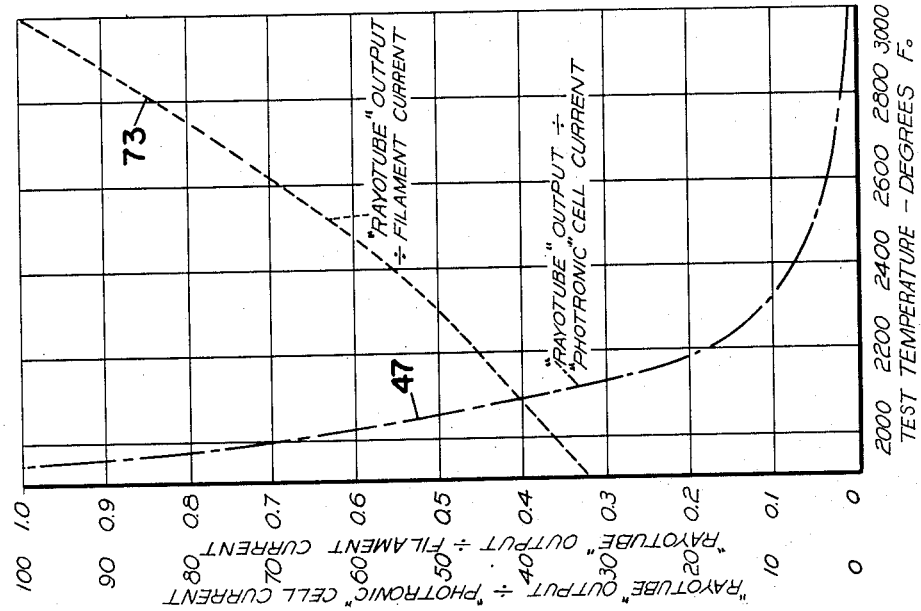
Figure 6:
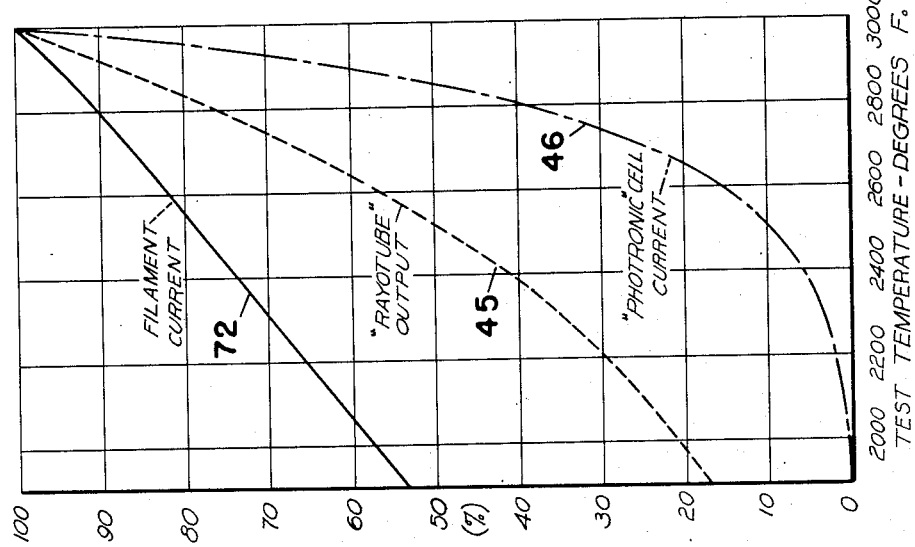

Figs. 6 and 7 are graphs explanatory of operational characteristics of certain components of a system embodying the invention.

The present invention is particularly useful for the continuous measurement of the temperature of molten steel or other molten materials by means of thermal radiation therefrom. In such application, as for example in the measurement of temperature of molten steel produced in induction furnaces, radiation sensitive devices are mounted within a housing 10, having an outwardly flaring end-portion 11, which is suitably supported, as by a tripod (not shown), to receive thermal radiation from the heated mass through the open end-portion 11. Due to the high temperature of molten metal, particularly steel, it is desirable, if not necessary, to cool the radiation sensitive devices, and this may be conveniently done by circulating cooling air from a suitable source through a connector 12 to which an air hose (not shown) may be secured in the usual manner. Air introduced through the connector 12 flows around and through the supporting elements and exits through the open end-portion 11, a plurality of openings 13 being provided in a diaphragm 14. Radiation received through the end-portion 11 falls upon the quartz lens 15. The lens 15 has such a focal length as to produce on a selective reflector 16 an image of a selected area of the molten metal whose temperature is to be measured. The selective reflector 16 preferably consists of a lightly gilded spherical glass member having a radius such as to produce on a target 17 an image of the lens 15. The target 17 has associated with it a radial array of thermocouples 18, one set of junctions of which are attached to the target 17.

For a more detailed disclosure of the thermopile comprising the target 17 and the thermocouples 18, reference may be had to Dike Patent No. 2,232,594 dated February 18, 1941. The target 17, its associated thermocouples 18, and the optical system associated therewith, are generally referred to as a radiation pyrometer, which in Fig 3 has been diagrammatically illustrated and identified as radiation pyrometer 19. The reflector 16 with its thin coating of gold directs upon the target 17 radiation of longer wavelengths, these wavelengths being greater than .6 micron. The reflector 16 also has the characteristic of transmitting radiation of wavelengths less than .6 micron. The transmitted radiation which is in the visible spectrum is directed upon a barrier layer cell 20. The barrier layer cell 20 may be either of the iron-selenide type sold under the trade name "Photronic" cell, or it may be of the copper-oxide type sold under the trade name "Rectox." The construction of such barrier layer cells is described at pages 416 et seq. of "Fundamentals of Engineering Electronics" by Dow (1937).

The electrical connections to the barrier layer cell 20 and to the thermocouples 18 have been omitted from Fig. 1 in order to simplify the drawing, but it is to be understood suitable connections are made at terminal screws 21 carried by the insulating bar 22, preferably relatively narrow and of rectangular shape so as to leave ample room between it and the housing 10 for flow of air around the inner assembly. A portion of a multi-conductor cable 21a has been illustrated to indicate its point of entry into the housing 10. The individual conductors not shown will, of course, be connected at the terminal screws 21 to complete the circuits. The insulating bar or block 22 is fastened by screws to a similar rectangular member 23 secured as by screws to studs 24 and 25. The remaining details of construction of the assembly of Fig. 1 may be readily understood from the drawing itself, including the provision and function of the centering screws 26, 27 and 28 for the ring support 29 of the thermocouples 18.

The apparatus of Figs. 1 and 2 is preferably utilized in a measuring circuit of the type diagrammatically illustrated in Fig. 3 where, it will be observed, the radiation pyrometer 19 and the barrier layer cell 20 are illustrated as physically separated, the better to indicate their respective operating functions. The barrier layer cell 20 is connected by a conductor 31 to a contact 32 which cooperates with a slidewire or resistance element 33. The left-hand end of the slidewire 33 is connected to a contact 34 associated with a second slidewire or resistance element 35. The slidewires 33 and 35 are so associated with their respective contacts 32 and 34 that simultaneous relative movement therebetween may be produced. As shown, such an arrangement may include a mechanical member indicated by the broken line 36 for simultaneous movement, upon operation of a knob 37, of the two contacts 32 and 34.

The barrier layer cell 20 is connected in a circuit which extends by way of conductor 31 to the contact 32, the left-hand side of slidewire 33, the contact 34, the right-hand side of slidewire 35, and by conductors 39 and a variable resistance 40 to the other side of the cell 20. Since the slidewires 33 and 35 are preferably of like construction and of the same total resistance value, upon rotation of the knob 37 and consequent movement of the contacts 32 and 34, there will be removed from circuit of the barrier layer cell 20 the same amount of resistance by one slidewire as is inserted therein by the other. In consequence, the resistance of the circuit through the slidewires 33 and 35 remains constant, irrespective of the relative positions of the contacts 32 and 34 with respect to their associated slidewires. The radiation pyrometer 19 is so connected as to oppose its potential difference against a potential difference developed by flow of current from the barrier layer cell 20 through the right-hand portion of slidewire 35 and a selected portion of the variable resistor 40. One side of the radiation pyrometer 19 is connected to the barrier layer cell 20 and to the circuit including the resistor 40, while the other side of pyrometer 19 is connected to a galvanometer 41 included in a circuit extending by way of conductor 42 to the left-hand end of slidewire 35.

With the pyrometer of Fig. 1 directed towards a radiating mass, such as molten steel, it will be understood that radiation pyrometer 19 and the barrier layer cell 20 will each have outputs related to the intensity of the radiation received therefrom. In the form of the invention illustrated in Fig. 3 a fraction of the potential difference developed by the barrier layer cell 20 in its output circuit is balanced against the potential difference from the radiation pyrometer 19. This is, of course, accomplished by rotating the knob 37 until the galvanometer 41 indicates a condition of balance. Further in accordance with the invention, a scale 43 may be associated with the slidewires 33 and 35 and calibrated for direct reading of the temperature of the mass, such as molten steel, under measurement.

Reference will now be made to Fig. 6 in which the curve 45 illustrates the relationship between the output of the "Rayotube" radiation pyrometer 19 and temperature, while the curve 46 illustrates the relationship between the output of the "Photronic" barrier layer cell 20 and temperature. For convenience, the output of the pyrometer 19 and of the barrier layer cell 20 for a temperature of 3,000° F. has been arbitrarily taken as 100%, the respective outputs for lesser temperatures then being given in percentage of the output at 3,000° F. Since, in Fig. 3, the measuring circuit provides a measurement of the quotient of the output of the pyrometer 19 divided by the current from the barrier layer cell 20, there has been shown in Fig. 7 a curve 47 showing the variation of that quotient with temperature. The wide variation in that quotient between temperatures somewhat below 2,000° F. and 3,000° F. demonstrates that the quotient changes in a unique manner.

An advantage in utilizing the radiation pyrometer 19 and the barrier layer cell 20 is that a very simple temperature measuring instrument is provided, one which requires neither standardizing equipment nor a separate source of power. The measuring apparatus itself need consist of only the apparatus shown in Fig. 3. The output is adequate for the measurement of temperature with high sensitivity and accuracy. In this connection, reference may be had to an equation which will be helpful in further understanding the invention.

In the case of an instrument that employs the ratio of two outputs from detectors of different effective wavelengths, the following equation applies:

$$\frac{dR/R}{dT/T} = \frac{C_2}{T}\left(\frac{1}{\lambda_1} - \frac{1}{\lambda_2}\right)$$

Where R is the quotient of the two outputs (the output of the element which is sensitive to the wavelength $\lambda_1$ divided by the output of the other element sensitive to the wavelength $\lambda_2$), T is the absolute temperature of the mass, $C_2$ is the second radiation constant in Wien's distribution law, $\lambda_1$ is the effective wavelength of radiation received by the first sensitive device, and $\lambda_2$ is the effective wavelength of the radiation received by the second sensitive device.

In accordance with the present invention, the rate of change of the ratio or quotient with respect to the rate of change of the temperature of the mass under measurement is made as large as possible. The larger this ratio can be made, the greater the sensitivity and accuracy of the instrument. Contrary to the prior practices of those skilled in the art, this ratio has been made very large by the selection of radiation of widely differing effective wavelengths for $\lambda_1$ and $\lambda_2$. In general, $\lambda_1$ and $\lambda_2$ have such values that the difference of their reciprocals is of the order of unity and above. In order to meet the objective of high sensitivity and accuracy, radiation responsive devices of different types were found desirable. More particularly, it is desired to use a very short effective wavelength for $\lambda_1$. Accordingly, the barrier layer cell 20 is utilized to produce an output in response to radiation of the selected effective short wavelengths. As indicated in Fig. 6, the output of the "Photronic" barrier layer cell, as shown by the curve 46, changes very materially for the temperature range 2,000° F. to 3,000° F.

In order that the effective wavelength for $\lambda_2$ may be relatively long, it was found desirable to utilize the radiation pyrometer 19, and as indicated by the curve 45 of Fig. 6, the output therefrom also materially changes over the temperature range 2,000° F. to 3,000° F.

By substituting $k$ for the right-hand member of the above equation, the equation may then be written in the following form:

$$\frac{dR}{R} = k\frac{dT}{T}$$

By selecting the wavelength, in the above-described manner, a change in the absolute temperature of the mass under measurement will, if $k$ is suitably large, produce a manifold change in the ratio $$\frac{dR}{R}$$

the result of which is high sensitivity and a relatively high power law for the operation of the measuring instrument. The factor $k$ in accordance with the present invention is in the foregoing manner made large by the selection of the widely differing wavelengths as above set forth. It is particularly desirable to utilize as short a wavelength as is practicable for $\lambda_1$.

If $\lambda_1$ and $\lambda_2$ were to be selected as .5 and .6 micron as shown in accordance with the teachings of the prior art, the value of $k$ would be approximately one-fifth of what it is by the selection of $\lambda_1$ and $\lambda_2$ in accordance with the present invention as .5 and 3 microns, these values being the effective wavelength values respectively of the barrier layer cell 20 and the radiation pyrometer 19. The percentage change in ratio resulting from a given percentage change in absolute temperature will be five times that of the prior-art system. Further in accordance with the invention, the barrier layer cell 20 is connected to operate in a constant resistance circuit for production thereby of a potential difference which varies solely in accordance with the current output of the barrier layer cell. By utilizing radiation sensitive devices of dissimilar characteristics; one a current output device, the other an electromotive force output device, full advantage is taken of the high power law which may be achieved by widely separating the effective wavelengths corresponding with $\lambda_1$ and $\lambda_2$ of the above equation, which results in an instrument of high sensitivity and accuracy and one which makes unnecessary the use of either standardizing devices or separate sources of power.

The advantage in utilizing two elements sensitive to widely different effective wavelengths is that there is attained a first order independence of emissivity change in the observed surface or mass and of smoke or other absorptive materials between the measuring instrument and the surface or mass whose temperature is to be measured. These advantages accrue by selection of radiation for the two elements 19 and 20 of character such that the difference of the reciprocals of the effective wavelengths is large.

While radiation pyrometer and barrier layer cells of conventional design have been referred to as desirable for use in the system of Fig. 3, it is to be understood that sensitive elements or devices of other kinds may be employed, so long as one will be responsive to radiation of one wavelength and the other responsive to radiation of a substantially differing wavelength to make large the difference of their reciprocals. In one embodiment of the invention sensitivities of the order of plus or minus 4° F. at a temperature of 3,000° F. as against sensitivities in the prior art devices of the order of plus or minus 18° F. are obtained. Sensitivities of this order were obtained by utilizing effective radiation for $\lambda_1$ of a wavelength of .5 micron and radiation of an effective wavelength for $\lambda_2$ of 3 microns.

In Fig. 5 there has been illustrated a wholly different type of a radiation variable current source to take the place of the barrier layer cell 20 of Fig. 3. The radiation pyrometer 19 is of the same construction as shown in Fig. 1 except that a handle 48 has been provided to be utilized in association with a second handle 49 for manual support of the device. Though manual support is contemplated, it will, in general, be better to provide a tripod or the like to hold the apparatus stationary during measurement of temperature.

The optical pyrometer 50 is of the type fully described in Bash Patent 1,362,281 and in brief consists of a lamp filament 51 energized from a suitable source 52 under the control of a current-regulating rheostat 53. The optical pyrometer includes an optical system by means of which the selected area of the mass whose temperature is to be measured may be brought to focus in the plane of the filament 51 so that the two together may be viewed through an eye-piece 54. Accordingly, and in accordance with the present invention, the optical system includes a lens 55 for bringing the selected area of the mass into focus in the plane of the filament 51. Suitable absorbing screens 56 and 57, respectively of blue-green glass and of purple glass or the equivalent, are included in the optical system to reduce the intensity of radiation. Additional screens 58 and 59 are included in the eye-piece to closely approximate a green glass.

The radiation pyrometer 19 functions as before and is responsive to the longer wavelengths. The optical pyrometer 50 by virtue of the transmission characteristics of one or more screens 58 and 59 in combination with the wavelength sensitivity of the observer's eye, makes the optical pyrometer 50 a device sensitive to radiation of short wavelength. In operation the operator views a selected part of the surface of the mass whose temperature is to be determined and adjusts the resistor 53 until the apparent brightness of the filament 51 matches that of the hot surface under observation. Those skilled in the art are familiar with such an optical pyrometer.

Though the arrangement of Fig. 5 may be utilized in Fig. 3 by substituting a circuit including conductors 60 and 61 in place of the barrier layer cell 20, it will be described in connection with Fig. 4. The system of Fig. 4 is quite similar to that of Fig. 3 and corresponding parts bear the same reference characters. In Fig. 4 the galvanometer 41 has been shown as comprising a part of a mechanical relay 62 which may be of any suitable type, though it has been symbolically represented to correspond with the one shown in detail in Squibb Patent 1,935,732. For a detailed description of the operation of such a mechanical relay 62, reference may be had to said Squibb patent.

Briefly, deflection of the galvanometer coil 41 in one direction or the other positions the pointer 63 between a pair of feeler members 64. By suitable cam mechanism the feeler members are released for operation by a spring 65 to position a clutch member 66 with reference to a disc 67. After deflection of the clutch member 66 it is moved into engagement with the disc 67. Thereafter restoring cams (not shown) return the clutch member 66 to the position illustrated and at the same time they rotate the disc 67 and the shaft diagrammatically indicated by the broken lines 36. The slidewires 33 and 35 are adjusted in a direction to balance the measuring circuit; that is, to balance the potential difference produced by the radiation variable current source 50 against the potential difference produced by the radiation variable voltage source 19. The shaft 36 also drives a pen and index 68 along a chart 69 and a scale 70. The motor 71 serves to drive the chart 69 at constant speed. Both the chart 69 and scale 70 may be calibrated in temperature.

In Fig. 6 the curve 72 shows the relationship of the filament current for the range of from somewhat below a temperature 2000° F. to 3000° F. where the value of filament current at 3000° F. has been taken as the 100% value. It is apparent that the output of the optical pyrometer 50 as shown by the curve 72 changes very materially within the illustrative temperature range.

In Fig. 7 the curve 73 illustrates the variation of the quotient of the "Rayotube" output divided by filament current with temperature in the range from somewhat below 2000° F. to 3000° F. The curve 73 demonstrates that the quotient changes in a unique manner. Though greatly differing from the curve 47, good sensitivity may be achieved by the modification of Fig. 5 in which the effective longer wavelength remains about 3 microns and the effective short wavelength for the optical pyrometer 50 is of the order of .55 micron.

While preferred modifications of the invention have been described, it is to be understood that further modifications may be made within the scope of the appended claims.

What is claimed is:

1. A pyrometer for the measurement of the temperature of a mass comprising a barrier layer cell responsive to thermal radiation of short wavelength from said mass within a predetermined band lower than seven-tenths of a micron for producing a current output in accordance therewith, a radiation pyrometer responsive to thermal radiation of long wavelength from said mass within a substantially different band above one micron and including radiation of wavelength of three microns and above for producing a potential difference output in accordance therewith, an optical system for directing radiation from said mass to said barrier layer cell and to said radiation pyrometer, a resistor in series-circuit relation with said barrier layer cell for developing from the current output from said barrier layer cell a potential difference, means including circuit connections from said resistor to said radiation pyrometer for applying a variable fraction of said potential difference in opposition to the potential difference produced by said radiation pyrometer, and means including a scale and associated element relatively movable with change of said fraction for indicating the temperature of said mass when said fraction equals said last-named potential difference.

2. A pyrometer for the measurement of the temperature of a mass comprising a barrier layer cell responsive to thermal radiation of short wavelength from said mass within a predetermined band lower than seven-tenths of a micron for producing a current output in accordance therewith, a pair of variable resistors, variable portions of both of which are connected in series-circuit relation with said barrier layer cell, means for concurrently adjusting said resistors for simultaneous change of the resistance of said resistors in opposite directions to maintain uniform the resistance of said series circuit through the range of adjustment of said resistors, a potential circuit connected to one of said variable resistors for deriving therefrom a variable potential difference which changes in adjustment of said resistor, a radiation pyrometer responsive to thermal radiation of long wavelength from said mass within a band substantially above one micron, said long and short wavelengths including effective wavelengths having spaced values such that the difference of their reciprocals is of a magnitude of the order of unity and above, where said wavelengths are expressed in micron units, said radiation pyrometer being connected in said potential circuit for producing therein a potential difference, an indicator responsive to the difference between the potential difference derived from said potential circuit and the potential difference developed by said radiation pyrometer, and a scale associated with said variable resistors for determining the temperature of the mass in terms of the ratio of the potential produced by said radiation pyrometer and that developed by said barrier layer cell.

3. A measuring circuit including in a series circuit a first radiation-responsive device for producing current flow in response to changes in the magnitude of a condition and variable portions of a pair of variable resistors, variable portions of which are connected in series-circuit relation with said device, a circuit connected to one of said variable resistors for deriving therefrom a potential difference, said last-named circuit including a second radiation-responsive device for producing a potential difference in accordance with changes in the magnitude of a condition in opposition to the potential difference derived from said resistor, means for concurrently adjusting said resistors for simultaneous change of the resistance of said resistors in opposite directions to maintain uniform the resistance of said series circuit through the range of adjustment of said resistors, a detector responsive to the difference between the potential developed in said last-named circuit and that derived from said one of said variable resistors, and indicating means associated with said resistors for determination of the ratio of one of said potential differences with respect to the other when said resistors are simultaneously adjusted to a point where the potential difference developed across said one of said variable resistors equals that developed by said second radiation-responsive device.

4. A pyrometer for the measurement of the temperature of a mass comprising a barrier layer cell responsive to thermal radiation of short wavelength from said mass within a predetermined band lower than seven-tenths of a micron for producing a current output in accordance therewith, a radiation pyrometer responsive to thermal radiation of long wavelength from said mass within a substantially different band above one micron for producing a potential difference output in accordance therewith, means for determining the temperature of said mass comprising a measuring network including an adjustable impedance for establishing a predetermined relationship between the current output of said barrier layer cell and the potential output of said radiation pyrometer, and means responsive to adjustment of said impedance to indicate a value representative of said temperature when said predetermined relationship is established.

5. A pyrometer system for the measurement of the temperature of a mass comprising a barrier layer cell responsive to thermal radiation of short wavelength from said mass within a predetermined band lower than seven-tenths of a micron for producing a current output in accordance therewith, a radiation pyrometer responsive to thermal radiation of long wavelength from said mass within a substantially different band above one micron for producing a potential difference output in accordance therewith, means for developing from the current output from said barrier layer cell a second potential difference, means for applying a variable fraction of said second potential difference in opposition to the potential difference produced by said radiation pyrometer, and a scale having an element movable relative thereto with change in the fraction of said second potential difference developed from said cell which opposes that of said pyrometer and for indicating the temperature of said mass when said fraction equals the potential difference developed by said radiation pyrometer.

6. A measuring circuit according to claim 3 wherein one of said radiation-responsive devices comprises a barrier layer cell.

7. A measuring circuit according to claim 3 wherein one of said radiation-responsive devices comprises an optical pyrometer.

8. A measuring circuit according to claim 3 wherein one of said radiation-responsive devices comprises a thermocouple device.

9. A pyrometer system for the measurement of the temperature of a mass comprising a radiation variable current source sensitive to thermal radiation of short wavelength from said mass within a predetermined band lower than seven-tenths of a micron for producing an electrical current output in accordance therewith, a radiation variable voltage source sensitive to thermal radiation of long wavelength from said mass within a substantially different band above one micron for producing a potential difference output in accordance therewith, said long and short wavelengths including effective wavelengths having spaced values, as expressed in microns, such that the difference of their reciprocals is of a magnitude of the order of unity and above, means for determining the temperature of said mass comprising a measuring network including an adjustable impedance for establishing a predetermined relationship between the current output of said radiation variable current source and the potential output of said radiation variable voltage source, and means responsive to adjustment of said impedance to indicate a value representative of said temperature when said predetermined relationship is established.

RAYMOND C. MACHLER.

References Cited in the file of this patent

UNITED STATES PATENTS

| Number | Name | Date |
| --- | --- | --- |
| 1,475,365 | Schueler et al. | Nov. 23, 1927 |
| 2,151,928 | Mead | Mar. 28, 1939 |
| 2,302,554 | Kingsbury | Nov. 17, 1942 |
| 2,501,377 | Cherry | Mar. 21, 1950 |

FOREIGN PATENTS

| Number | Country | Date |
| --- | --- | --- |
| 113,865 | Great Britain | Mar. 4, 1918 |
| 621,678 | Great Britain | Apr. 14, 1949 |

OTHER REFERENCES

Article, "A New Two Color Optical Pyrometer," Journal of Scientific American, vol. 30, June 1940.